United States Patent [19]

Neasham

[11] Patent Number: 4,628,244
[45] Date of Patent: Dec. 9, 1986

[54] ELECTRICAL INDICATING CIRCUIT

[75] Inventor: David L. Neasham, Penkridge, England

[73] Assignee: Thorn Emi Automation Limited, Rugeley, England

[21] Appl. No.: 716,250

[22] Filed: Mar. 26, 1985

[51] Int. Cl.[4] .............................................. H02J 7/04
[52] U.S. Cl. ........................................ 320/48; 320/32
[58] Field of Search ....................... 320/32, 48, 31, 22, 320/35, 36, 39, 40; 324/429, 430

[56] References Cited

U.S. PATENT DOCUMENTS 3,567,487 4/1971 Chase .................................. 320/21 X
4,204,153 5/1980 Brown ............................... 320/48 X
4,385,269 5/1983 Aspinwall et al. ............... 320/35 X Primary Examiner—R. J. Hickey
Attorney, Agent, or Firm—Fleit, Jacobson, Cohn & Price

[57] ABSTRACT

In some industrial situations a battery charger is used to supply d.c. power to an electrical equipment, and a battery is connected across the output terminals of the charger so that a "back-up" supply is available if the charger should fail. An indicating circuit is used to generate a warning if an open circuit condition arises in the battery charging circuit. The indicating circuit operates by monitoring the output impedance of the battery charger. If the output impedance exceeds a threshold value the indicating circuit generates a warning signal.

4 Claims, 2 Drawing Figures

4,628,244

ELECTRICAL INDICATING CIRCUIT

FIELD OF THE INVENTION

This invention relates to an electrical indicating circuit suitable for indicating an open circuit condition in a battery charging circuit.

BACKGROUND OF THE INVENTION

In some industrial situations, as can arise, for example, in a power station or a petro-chemical installation, equipment performing vital operational functions should be provided with an uninterrupted d.c. power supply.

Hitherto, a mains-powered battery charger has been used to supply d.c. power to an equipment while maintaining a battery, connected across the output terminals of the charger, at an appropriate d.c. voltage. If the battery charger should fail power may still be supplied by the battery and so a vital operational function can be maintained.

A problem arises if the charging circuit becomes open circuit as would happen, for example, if the battery became disconnected. Since, in these circumstances, a "back-up" power supply is no longer available satisfactory operation of the equipment cannot be assured and a potentially hazardous situation may develop.

SUMMARY OF THE INVENTION

It is an object of the invention to provide an electrical indicating circuit for indicating an open circuit condition in a battery charging circuit whereby the above-described problem is at least alleviated.

It is a further object of the invention to provide such an electrical indicating circuit which operates by monitoring the output impedance of a battery charger, forming part of the battery charging circuit, comparing the output impedance, so monitored, with a threshold value and generating an indication in dependence on the comparison.

It is a yet further object of the invention to provide such an electrical indicating circuit comprising first circuit means for generating respective voltages related to the output current and the output voltage from the battery charger, second circuit means for generating a ratio signal related to the ratio of the voltages generated by the first circuit means and third circuit means for comparing said ratio signal with a threshold signal and for generating an indication of an open circuit condition in dependence on the comparison.

DESCRIPTION OF THE DRAWINGS

In order that the invention may be carried readily into effect an embodiment thereof is now described, by way of example only, by reference to the accompanying drawings of which.

DETAILED DESCRIPTION OF A PREFERRED EMBODIMENT

Figure 1:
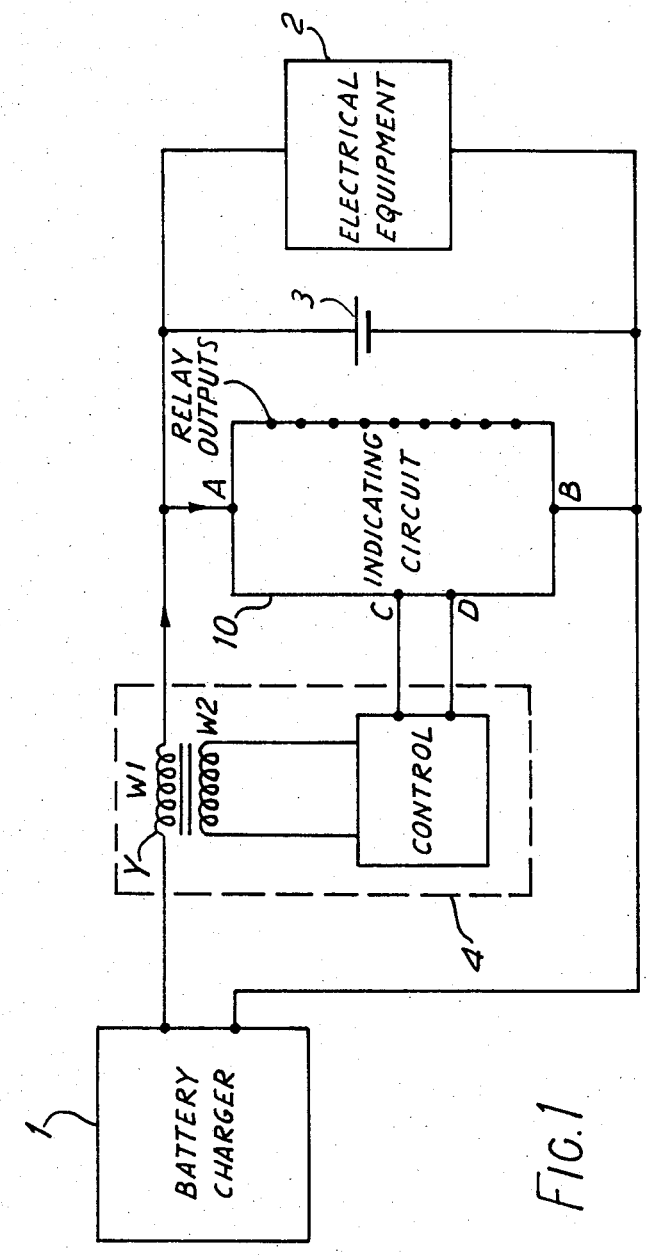
FIG. 1 shows, in block schematic form, a power supply incorporating an electrical circuit in accordance with the instant invention.

Referring initially to FIG. 1 of the drawings a battery charger 1, of conventional form, is used to supply a d.c. voltage to an electrical equipment represented schematically at 2. As described hereinbefore, a battery 3 which may, for example, be a lead-acid or a nickel-cadmium cell is connected across the output terminals of the battery charger to provide a "back-up" power supply should the charger itself fail to operate. Typically a battery charger employed in this kind of application delivers a full-wave rectified voltage signal.

Figure 2:
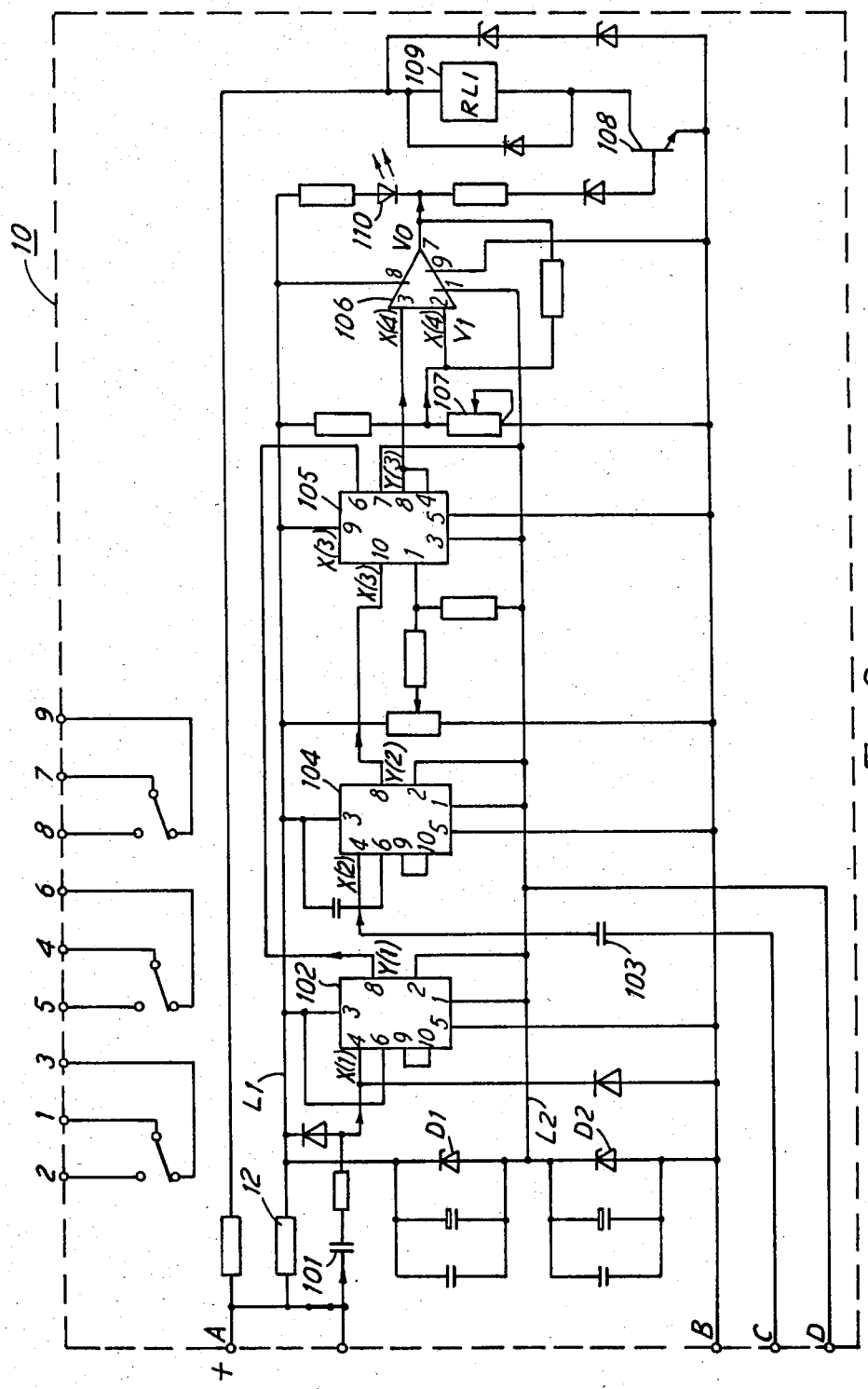
FIG. 2 shows the electrical circuit of FIG. 1 in greater detail.

An electrical circuit 10, in accordance with this example of the instant invention, is connected across the output terminals of the battery charger to generate a warning if a discontinuity in the charging circuit occurs—due, for example, to disconnection of the battery. Circuit 10 is shown in greater detail in FIG. 2.

The output voltage from the battery charger is applied across the positive and negative input terminals (A, B) of circuit 10. The output voltage is coupled, via a capacitor 101, to an input terminal X(1) of an integrated circuit 102 (e.g. AD 536 AKH manufactured by Analog Devices Inc.) connected across supply rails $L_1$, $L_2$ which are held at an appropriate supply voltage by means of a voltage clamp consisting of a resistor R and a pair of Zener diodes $D_1$ and $D_2$. The integrated circuit is arranged to generate, at an output terminal Y(1), a d.c. voltage of a magnitude $V_1$ proportional to the r.m.s. value of the applied output ripple voltage from the battery charger.

Output current from the battery charger is monitored by means of a transformer T which forms part of a control circuit, shown generally at 4 in FIG. 1. The primary winding W1 of the transformer is connected in series with the positive supply line to the battery and a voltage, proportional to output current, is developed across the secondary winding W2. After suitable scaling (if desired) in circuit 4 this voltage is applied across further input terminals (C, D) of circuit 10 and coupled, via a capacitor 103, to an input terminal X(2) of a second integrated circuit 104, identical to circuit 102.

As before, circuit 104 is arranged to generate, at an output terminal Y(2), a further d.c. voltage which, in this case, is of a magnitude $V_2$ proportional to the r.m.s. value of applied output ripple current from the battery charger.

The d.c. voltages generated in circuits 102 and 104, in the above-described manner, are applied to respective input terminals X(3) of a further integrated circuit 105 (e.g. AD 534 KH manufactured by Analog Devices Inc). This circuit operates on the voltages applied thereto to generate, at an output location Y(3), a further d.c. voltage of a magnitude $V_3$ proportional to the ratio $V_1/V_2$ and so the output impedance Z of the battery charger.

It is found that the output impedance provides a sensitive measure of the continuity state of the charging circuit; more specifically, if the charging circuit becomes open circuit, because, for example, the battery has become disconnected, the output impedance will show a significant increase. This increase is detected by means of a comparator 106 (e.g. LM 311 J-8 manufactured by National Semiconductor Corp) which receives, at respective input terminals X(4), a threshold voltage set by means of a user-adjustable potentiometer 107, and the d.c. voltage, of magnitude $V_3$, generated at the output of circuit 105. The threshold voltage is set at a value $V_T$ commensurate with detecting an increased output impedance due to the occurrence of an open circuit in the charging circuit. If $V_3$ should exceed $V_T$ (indicating an open circuit condition) the comparator generates an output voltage $V_o$ which is sufficient to render a transistor 108 non-conductive. This, in turn, causes a relay 109 to de-energise and trigger a number of alarms some, or all, of which may be located at remote monitoring stations. In this example, the relay has three relay elements, shown schematically at RL1/3, RL2/3, RL3/3, associated with respective alarms. In addition, the output voltage $V_o$ also energises a light emitting diode 110 which provides a local indication that an open circuit condition has arisen and that the relay has been de-energised.

It will be appreciated that the relay may comprise as many relay elements as are desired and these may be used to trigger any convenient form of alarm e.g. visual, audible to provide an indication. Furthermore, the local alarm alone could be used.

It has been found that an electrical circuit, in accordance with the instant invention, which operates by monitoring the output impedance of an associated battery charger provides an effective and reliable way of detecting and indicating an open circuit condition in a battery charging circuit.

I claim:

1. An electrical indicating circuit suitable for indicating an open circuit condition in a battery charging circuit in which a battery charger is coupled across a battery, the indicating circuit comprising first circuit means for generating respective voltages related to the output current and the output voltage from the battery charger, second circuit means for generating a ratio signal related to the ratio of the voltages, generated by said first circuit means, and so to the output impedance of the battery charger, and third circuit means for comparing said ratio signal with a threshold signal and for generating an indication, indicative of an open circuit condition, in dependence on the comparison.

2. An electrical indicating circuit according to claim 1 wherein said first circuit means includes respective electrical circuits for generating d.c. voltages proportion to the r.m.s. values of the output voltage and the output current from the battery charger.

3. An electrical indicating circuit according to claim 1 wherein said third circuit means includes a relay circuit arranged to initiate said indication, in dependence on the comparison.

4. An electrical indicating circuit according to claim 3 wherein said third circuit means includes indication means energisable, in dependence on said comparison and independently of said relay circuit, thereby to generate a said indication.

* * * * *